United States Patent
Bartels et al.

(10) Patent No.: US 12,359,113 B2
(45) Date of Patent: Jul. 15, 2025

(54) METHOD FOR DISPERSING KINETIC HYDRATE INHIBITORS

(71) Applicant: ChampionX LLC, Sugar Land, TX (US)

(72) Inventors: Jeremy Wayne Bartels, Sugar Land, TX (US); Regan Andrew Jones, Sugar Land, TX (US); Kevin Patrick McNamee, Banchory (GB); Thomas M. Weathers, Jr., Katy, TX (US)

(73) Assignee: ChampionX LLC, Sugar Land, TX (US)

( * ) Notice: Subject to any disclaimer, the term of this patent is extended or adjusted under 35 U.S.C. 154(b) by 270 days.

(21) Appl. No.: 15/995,501

(22) Filed: Jun. 1, 2018

(65) Prior Publication Data

US 2018/0346791 A1   Dec. 6, 2018

Related U.S. Application Data

(60) Provisional application No. 62/514,279, filed on Jun. 2, 2017.

(51) Int. Cl.
*C09K 8/524* (2006.01)
*C09K 8/52* (2006.01)
*C09K 8/54* (2006.01)

(52) U.S. Cl.
CPC ............ *C09K 8/524* (2013.01); *C09K 8/52* (2013.01); *C09K 8/54* (2013.01); *C09K 2208/22* (2013.01)

(58) Field of Classification Search
CPC ...... C09K 2208/22; C09K 8/52; C09K 8/524; C09K 8/54
See application file for complete search history.

(56) References Cited

U.S. PATENT DOCUMENTS

| | | | |
|---|---|---|---|
| 2,866,684 A | 12/1958 | Colwell | |
| 3,850,898 A | 11/1974 | Ide et al. | |
| 4,309,291 A | 1/1982 | Probstein et al. | |
| 4,536,294 A | 8/1985 | Guillet et al. | |
| 5,868,945 A | 2/1999 | Morrow et al. | |
| 5,922,207 A | 7/1999 | Willis et al. | |
| 6,194,622 B1 | 2/2001 | Peiffer et al. | |
| 6,251,836 B1* | 6/2001 | Duncum | C09K 8/52 507/90 |
| 8,921,478 B2 | 12/2014 | Conrad et al. | |
| 9,193,898 B2 | 11/2015 | Chang et al. | |
| 2006/0205603 A1 | 9/2006 | Colle et al. | |
| 2008/0058229 A1 | 3/2008 | Berkland et al. | |
| 2008/0121564 A1* | 5/2008 | Smith | C10G 1/00 208/13 |
| 2008/0253840 A1* | 10/2008 | Shiau | B09C 1/08 405/128.75 |
| 2009/0021262 A1* | 1/2009 | Zamfes | G01V 3/20 324/356 |
| 2010/0018712 A1 | 1/2010 | Tian et al. | |
| 2010/0099807 A1 | 4/2010 | Carlise et al. | |
| 2010/0099814 A1 | 4/2010 | Conrad et al. | |
| 2011/0240915 A1* | 10/2011 | Tian | C08L 33/26 252/182.29 |
| 2011/0272362 A1 | 11/2011 | Sikes et al. | |
| 2011/0308625 A1* | 12/2011 | Stoisits | F17D 3/14 137/1 |
| 2012/0157351 A1 | 6/2012 | Webber | |
| 2012/0161070 A1 | 6/2012 | Webber et al. | |
| 2012/0205561 A1* | 8/2012 | Baugh | E21B 33/064 251/1.1 |
| 2012/0247972 A1 | 10/2012 | Spencer et al. | |
| 2013/0087502 A1* | 4/2013 | Blumer | B01D 61/14 210/708 |
| 2014/0011712 A1* | 1/2014 | Frantz | C09K 8/36 507/131 |
| 2014/0144810 A1 | 5/2014 | Schrader | |
| 2014/0158633 A1 | 6/2014 | Holt | |
| 2015/0008190 A1 | 1/2015 | Moen et al. | |
| 2015/0191645 A1 | 7/2015 | Levey et al. | |
| 2016/0122619 A1 | 5/2016 | Lucente-Schultz et al. | |
| 2016/0200968 A1* | 7/2016 | Anderson | E21B 43/34 166/267 |
| 2016/0231247 A1 | 8/2016 | Abla et al. | |
| 2016/0362595 A1* | 12/2016 | Acosta | C09K 8/52 |
| 2018/0195009 A1* | 7/2018 | Cho | B01D 19/00 |

FOREIGN PATENT DOCUMENTS

| | | |
|---|---|---|
| CA | 3047379 A1 | 6/2018 |
| CN | 1757965 A | 4/2006 |
| CN | 101544817 A | 9/2009 |
| CN | 104910887 A | 9/2015 |
| CN | 105802599 A | 7/2016 |
| WO | 2005/092470 A1 | 10/2005 |
| WO | 2012/128910 A1 | 9/2012 |
| WO | 2013/041143 A1 | 3/2013 |

(Continued)

OTHER PUBLICATIONS

International Search Report and Written Opinion relating to PCT Application No. PCT/US2018/035557 dated Aug. 29, 2018, 11 pages.

(Continued)

*Primary Examiner* — Alicia Bland

(74) *Attorney, Agent, or Firm* — Stinson LLP

(57) ABSTRACT

Methods and dispersing agents for dispersing a polymeric low dose hydrate inhibitor are disclosed. More specifically, the method comprises contacting an aqueous fluid containing a polymeric low dose hydrate inhibitor with a dispersing agent. The dispersing agent can be selected from the group consisting of a $C_1$-$C_{20}$ alkyl sulfate, a $C_{10}$-$C_{20}$ alkyl ether sulfate, a $C_{10}$-$C_{20}$ carbonyl sarcosinate, a $C_{10}$-$C_{20}$ alkylbenzene sulfonate, a quaternary-ammonium based corrosion inhibitor, a glycol ether, and a combination thereof.

20 Claims, No Drawings

(56) References Cited

FOREIGN PATENT DOCUMENTS

| WO | 2014/065675 A1 | 5/2014 | |
|---|---|---|---|
| WO | WO-2016089599 A1 * | 6/2016 | ............ C09K 8/805 |
| WO | 2016/187672 A1 | 12/2016 | |

OTHER PUBLICATIONS

Anderson, Ross et al., Kinetic hydrate inhibitor removal from produced waters by solvent extraction, Journal of Petroleum Science and Engineering, 145 (2016) pp. 520-526.

Mady, Mohamed F. et al., Fluorinated Quaternary Ammonium Bromides: Studies on Their Tetrhydrofuran Hydrate Crystal Growth Inhibition and as Synergists with Polyvinylcaprolactam Kinetic Gas Hydrate Inhibitor, ACS Publications, Energy Fuels (2013) 27, pp. 5175-5181.

Ramaswamy, Divya et al., The Effect of Surfactants on the Kinetics of Hydrate Formation, SPE 141226 (SPE International Symposium on Oilfield Chemistry), Society of Petroleum Engineers (2011), pp. 1-15.

Jordan, M. M. et al., The Impact of Kinetic Hydrate Inhibitors Within Produced Water on Water Injection/Disposal Wells, Society of Petroleum Engineers International 168173 (2014), pp. 1-21.

Yan, Wang Jian Wu Bin Zhang et al., Lab study on hyperhaline/cationic polymer drilling fluid for deepwater drilling, China Offshore Oil and Gas, 2007, 6:013, 6 pages (English abstract only).

* cited by examiner

METHOD FOR DISPERSING KINETIC HYDRATE INHIBITORS

CROSS-REFERENCE TO RELATED APPLICATION

This application claims priority to U.S. Provisional Patent Application Ser. No. 62/514,279 filed on Jun. 2, 2017, the disclosure of which is incorporated herein by reference in its entirety.

FIELD OF THE INVENTION

The present disclosure generally relates to methods for the dispersal of a polymeric low dose hydrate inhibitor in an aqueous fluid containing the polymeric low dose hydrate inhibitor. The method comprises contacting the aqueous fluid containing the polymeric low dose hydrate inhibitor with a dispersing agent.

BACKGROUND OF THE INVENTION

Low-boiling hydrocarbons, such as methane, ethane, propane, butane, and iso-butane, are normally present in conduits which are used for the transport and processing of oil and gas. If a substantial amount of water is also present, it is possible that the water/hydrocarbon mixture forms gas hydrate crystals under conditions of low temperature and elevated pressure. These crystals can be formed in a fluid whether the fluid is flowing or stationary.

Gas hydrates, also known as clathrates, are crystalline solids composed of water and gas. In these solids, the gas molecules (guests) are trapped in water cavities (host) that are composed of hydrogen-bonded water molecules. Methane is the main gas in naturally occurring gas hydrates, however carbon dioxide, hydrogen sulfide, and less frequently, other hydrocarbons such as ethane and propane can be found within the hydrate structure.

Gas hydrates can be easily formed during the transportation of oil and gas in pipelines under certain conditions. Factors affecting gas hydrate formation include gas composition, water content, temperature, and pressure, particularly low temperature and high pressure. While these crystalline cage-like structures are small initially, they are able to agglomerate into solid masses called gas hydrate plugs. The formation of gas hydrates within a pipeline often results in lost oil or gas production, damage to transmission lines and equipment, and safety hazards to field workers.

Three types of hydrate inhibitors are currently available to the energy industry for controlling gas hydrates: thermodynamic hydrate inhibitors (THIs), kinetic hydrate inhibitors (KHIs), and anti-agglomerates (AAs). THIs must be added in large amounts to be effective, typically on the order of several tens of percent by weight of the water present. On the other hand, KHIs and AAs are typically added on the order of one to five percent by weight of the water present.

Produced water that contains any quantity of low dose hydrate inhibitors (particularly KHIs but also potentially AAs) can cause problems including fouling of injection/disposal wells and damage to reservoirs. Furthermore, by reinjecting produced water, these inhibitors can become insoluble and precipitate at high temperatures resulting in blocked underground reservoirs, wells, and the like. Additionally, this blockage can result in reduced injection efficiency and result in reduced hydrocarbon extraction and recovery.

Accordingly, there is an ongoing need for methods and compositions that can effectively disperse water soluble hydrate inhibitors from waste water streams of various hydrocarbon extraction and recovery processes.

SUMMARY OF THE INVENTION

Methods for dispersing a polymeric low dose hydrate inhibitor in an aqueous fluid containing the polymeric low dose hydrate inhibitor are described herein. The method comprises contacting the aqueous fluid containing the polymeric low dose hydrate inhibitor with a dispersing agent.

The aqueous fluid can comprise a waste water stream.

The waste water to be treated with the dispersing agent can be present in an injection reservoir, a separator, a slug catcher, a holding tank, a stationary holding apparatus, or a flowing pipeline.

The waste water to be treated with the dispersing agent can be present in an injection reservoir and the injection reservoir can be present in the original formation or in a nearby depleted reservoir.

The waste water stream can comprise an aqueous liquid, an organic liquid, or a combination thereof.

The dispersing agent can be added as a solid, in the form of a powder, or as a solution dissolved in an aqueous or organic liquid. Preferably, the dispersing agent is contacted with the aqueous fluid containing the polymeric low dose hydrate inhibitor as a solution.

The dispersing agent can be selected from the group consisting of a $C_1$-$C_{20}$ alkyl sulfate, a $C_{10}$-$C_{20}$ alkyl ether sulfate, a $C_{10}$-$C_{20}$ carbonyl sarcosinate, a $C_{10}$-$C_{20}$ alkylbenezene sulfonate, a quaternary-ammonium based corrosion inhibitor, a glycol ether, and a combination thereof.

The dispersing agent can be sodium lauryl sulfate, ammonium lauryl sulfate, sodium pareth sulfate, sodium lauroyl sarcosinate, sodium myreth sulfate, magnesium laureth sulfate, or sodium dodecylbenzenesulfonate.

Where the dispersing agent comprises a $C_1$-$C_{20}$ alkyl sulfate, it also can have a counter cation selected from the group consisting of sodium, calcium, potassium, magnesium, ammonium, and a combination thereof.

The dispersing agent can comprise sodium dodecyl sulfate (SDS).

Where the dispersing agent comprises a quaternary-ammonium based corrosion inhibitor, the quaternary-ammonium based corrosion inhibitor can be selected from the group consisting of benzyl-dimethyl-dodecyl ammonium chloride, benzyl-dimethyl-tetradecyl ammonium chloride, benzyl-dimethyl-hexadecyl ammonium chloride, benzyl-dimethyl-octadecyl ammonium chloride, an alkyl t-butylammonium halide quaternary ammonium salt, and a combination thereof.

Where the dispersing agent comprises a glycol ether, the glycol ether can be selected from the group consisting of diethylene glycol monoethyl ether, ethylene glycol monobutyl ether, and a combination thereof.

The polymeric low dose hydrate inhibitor can comprise a polymeric kinetic hydrate inhibitor, an anti-agglomerate hydrate inhibitor, or a combination thereof. Preferably, the polymeric low dose hydrate inhibitor comprises a polymeric kinetic hydrate inhibitor.

The polymeric low dose hydrate inhibitor can be a polyvinylcaprolactone; a polyvinylpyrrolidone; a copolymer of a polyvinylcaprolactone and a polyvinylpyrrolidone; a terpolymer of a polyvinylcaprolactone, a polyvinylpyrrolidone, and a polyvinyl acetate; a dendrimeric polyesteramide derived from hexahydrophthalic anhydride; diisopropanol amine, and N,N-bis(3-dimethylaminopropyl)amine; a substituted polyethyleneimine; a polyoxyalkylenediamine; a dicarboxylic acid-polyol polyester; a polycyclicpolyether polyol; a hyperbranched polyester polyol having hydroxyl end groups; a hyperbranched polyester polyamine; a hyperbranched polyamidoamine; a linear polyester polyamine; or a combination thereof.

For example, the polymeric kinetic hydrate inhibitor can comprise a homopolymer or a copolymer comprising poly(N-vinyl caprolactam), poly(N-vinyl pyrrolidone), 2-trimethylammonium methacrylate chloride, 3-dimethylaminopropyl methacrylamide, 2-dimetyhlaminoethyl methacrylate, N-methyl-N-vinylacetamide, poly(N-isopropyl methacrylamide), poly(N-isopropyl methacrylamide-co-3-trimethylammoniumpropyl methacrylamide chloride), or a combination thereof.

The dispersing agent is contacted with the aqueous fluid at a concentration of from about 0.001 wt % to about 10 wt % or from about 0.5 wt % to about 1 wt % based on the amount of the hydrate inhibitor in the solution.

Other objects and features will be in part apparent and in part pointed out hereinafter.

DETAILED DESCRIPTION OF THE INVENTION

A method for dispersing low dose hydrate inhibitors, particularly polymeric low dose hydrate inhibitors, in produced waste water streams prior to injection into a water disposal well is disclosed. The method comprises contacting a dispersing agent with an aqueous fluid containing the low dose hydrate inhibitors, particularly polymeric kinetic hydrate inhibitors. The contact of these two agents disperses the polymeric low dose hydrate inhibitor within the aqueous fluid. By dispersing the polymeric low dose hydrate inhibitor in the process waste water, issues with kinetic hydrate inhibitors causing reservoir damage or degrading water quality are addressed.

Methods for dispersing a polymeric low dose hydrate inhibitor in an aqueous fluid containing the polymeric low dose hydrate inhibitor are described herein. The method comprises contacting the aqueous fluid containing the polymeric low dose hydrate inhibitor with a dispersing agent.

The aqueous fluid can comprise a waste water stream.

The waste water to be treated with the dispersing agent can be present in an injection reservoir, a separator, a slug catcher, a holding tank, a stationary holding apparatus, or a flowing pipeline.

The waste water to be treated with the dispersing agent can be present in an injection reservoir and the injection reservoir can be present in the original formation or in a nearby depleted reservoir.

The waste water stream can comprise an aqueous liquid, an organic liquid, or a combination thereof.

The dispersing agent can be added as a solid, in the form of a powder, or as a solution dissolved in an aqueous or organic liquid. Preferably, the dispersing agent is contacted with the aqueous fluid containing the polymeric low dose hydrate inhibitor as a solution. The injection point of the dispersing agent is dependent on the positioning of piping and/or holding tanks for the particular system being treated. Upon contacting the dispersing agent to the system, dispersal of the polymeric low dose hydrate inhibitor can occur in a matter of seconds to minutes.

The dispersing agent can be added in a batch-wise or in a metered injection method. The batch-wise injection method might be better suited for a stationary tank whereas a metered injection method might be better suited for a continuous flow process.

The dispersing agent can be selected from the group consisting of a $C_1$-$C_{20}$ alkyl sulfate, a $C_{10}$-$C_{20}$ alkyl ether sulfate, a $C_{10}$-$C_{20}$ carbonyl sarcosinate, a $C_{10}$-$C_{20}$ alkylbenzene sulfonate, a quaternary-ammonium based corrosion inhibitor, a glycol ether, and a combination thereof.

The dispersing agent can be sodium lauryl sulfate, ammonium lauryl sulfate, sodium pareth sulfate, sodium lauroyl sarcosinate, sodium myreth sulfate, magnesium laureth sulfate, or sodium dodecylbenzenesulfonate.

Preferably, the dispersing agent is a $C_1$-$C_{20}$ alkyl sulfate.

The dispersing agent can be a $C_2$-$C_{20}$ alkyl sulfate, a $C_4$-$C_{20}$ alkyl sulfate, a $C_6$-$C_{20}$ alkyl sulfate, a $C_8$-$C_{20}$ alkyl sulfate, a $C_{10}$-$C_{20}$ alkyl sulfate, a $C_{12}$-$C_{20}$ alkyl sulfate, a $C_2$-$C_{18}$ alkyl sulfate, a $C_4$-$C_{18}$ alkyl sulfate, a $C_6$-$C_{18}$ alkyl sulfate, a $C_8$-$C_{18}$ alkyl sulfate, a $C_{10}$-$C_{18}$ alkyl sulfate, a $C_{12}$-$C_{18}$ alkyl sulfate, a $C_2$-$C_{16}$ alkyl sulfate, a $C_4$-$C_{16}$ alkyl sulfate, a $C_6$-$C_{16}$ alkyl sulfate, a $C_8$-$C_{16}$ alkyl sulfate, a $C_{10}$-$C_{16}$ alkyl sulfate, a $C_{12}$-$C_{16}$ alkyl sulfate, or a combination thereof.

Where the dispersing agent comprises a $C_1$-$C_{20}$ alkyl sulfate, it also can have a counter cation selected from the group consisting of sodium, calcium, potassium, magnesium, ammonium, and a combination thereof.

The dispersing agent can comprise sodium dodecyl sulfate (SDS).

Where the dispersing agent comprises a quaternary-ammonium based corrosion inhibitor, the quaternary-ammonium based corrosion inhibitor can be selected from the group consisting of benzyl-dimethyl-dodecyl ammonium chloride, benzyl-dimethyl-tetradecyl ammonium chloride, benzyl-dimethyl-hexadecyl ammonium chloride, benzyl-dimethyl-octadecyl ammonium chloride, an alkyl t-butylammonium halide quaternary ammonium salt, and a combination thereof.

Where the dispersing agent comprises a glycol ether, the glycol ether can be selected from the group consisting of diethylene glycol monoethyl ether, ethylene glycol monobutyl ether, and a combination thereof.

The polymeric low dose hydrate inhibitor can comprise a polymeric kinetic hydrate inhibitor, an anti-agglomerate hydrate inhibitor, or a combination thereof. Preferably, the polymeric low dose hydrate inhibitor comprises a polymeric kinetic hydrate inhibitor.

The polymeric low dose hydrate inhibitor can be a polyvinylcaprolactone; a polyvinylpyrrolidone; a copolymer of a polyvinylcaprolactone and a polyvinylpyrrolidone; a terpolymer of a polyvinylcaprolactone, a polyvinylpyrrolidone, and a polyvinyl acetate; a dendrimeric polyesteramide derived from hexahydrophthalic anhydride; diisopropanol amine, and N,N-bis(3-dimethylaminopropyl)amine; a substituted polyethyleneimine; a polyoxyalkylenediamine; a dicarboxylic acid-polyol polyester; a polycyclicpolyether polyol; a hyperbranched polyester polyol having hydroxyl end groups; a hyperbranched polyester polyamine; a hyperbranched polyamidoamine; a linear polyester polyamine; or a combination thereof.

For example, the polymeric kinetic hydrate inhibitor can comprise a homopolymer or a copolymer comprising poly(N-vinyl caprolactam), poly(N-vinyl pyrrolidone), 2-trimethylammonium methacrylate chloride, 3-dimethylaminopropyl methacrylamide, 2-dimetyhlaminoethyl methacrylate, N-methyl-N-vinylacetamide, poly(N-isopropyl methacrylamide), poly(N-isopropyl methacrylamide-co-3-trimethylammoniumpropyl methacrylamide chloride), or a combination thereof.

Additionally, the polymeric low dose hydrate inhibitor can comprise repeat units derived from a first monomer, a second monomer, or a combination thereof.

For the polymeric low dose hydrate inhibitors, the first monomer can be an acrylamide monomer, acrylate monomer, N-vinyl monomer, N-vinyl caprolactam monomer, N-vinyl amine monomer, anhydride monomer, dicarboxylic acid monomer, diester monomer, diol monomer, amine monomer, diamine monomer, dihydroxy acid monomer, dihydroxy ester monomer, hydroxy ester monomer, hydroxy acid monomer, or a combination thereof. Preferably, the acrylamide monomer can comprise N-isopropyl methacrylamide, N-isopropylacrylamide, or a combination thereof.

For the polymeric low dose hydrate inhibitors, the second monomer can comprise methacrylamidopropyltrimethylammonium chloride, 2-(dimethylamino)ethyl methacrylamide, 3-(acryloylamino)propyl]trimethyl ammonium chloride (APTAC), 2-acryloyloxyethyltrimethyl ammonium chloride (AETAC), 2-methacryloyloxyethyltrimethyl ammonium chloride (METAC), diallyldimethyl ammonium chloride (DADMAC), acryloyloxyethyldimethylbenzyl ammonium chloride (AEDBAC), or methacryloyloxyethyldimethylbenzyl ammonium chloride (MEDBAC), 2-acrylamido-2-methylpropane sulfonic acid (AMPS), 2-acrylamido-2-methylpropane sulfonic acid sodium salt (AMPS sodium salt), or a combination thereof.

When the 2-(dimethylamino)ethyl methacrylamide is used as a second monomer, the resulting polymer, oligomer, or dendrimer comprising repeat units derived therefrom can be reacted (i.e., salted) with an organic acid (e.g., acetic acid, acrylic acid, and the like) or an inorganic acid (hydrochloric acid, sulfuric acid, and the like) to make an acid salt of the amine group.

The polymeric low dose hydrate inhibitors can comprise a copolymer or cooligomer comprising repeat units derived from N-isopropyl methacrylamide, methacrylamidopropyltrimethylammonium chloride, 2-(dimethylamino)ethyl methacrylamide, or a combination thereof. Preferably, the polymeric low dose hydrate inhibitors can comprise repeat units derived from isopropyl methacrylamide and methacrylamidopropyltrimethylammonium chloride.

The polymeric low dose hydrate inhibitor can be synthesized by any means known in the art, such as, for example radical polymerization. For example, representative polymers can be prepared by the free radical polymerization of a first monomer (e.g., an acrylamide monomer) and a second monomer (e.g., a methacrylamidopropyltrimethylammonium chloride or 2-(dimethylamino)ethyl methacrylamide monomer).

Typically, the polymeric low dose hydrate inhibitor can be prepared by combining one or more vinyl monomers (e.g., monomers described as the first monomer and second monomer herein) in an alcohol solvent (e.g., diethylene glycol monoethyl ether) followed by stirring and heating the reaction mixture to about 100° C. for two hours. During this time, an initiator (e.g., t-butyl peroctanoate) is added to the reaction mixture.

The dispersing agent can be contacted with the aqueous fluid at a concentration of from about 0.001 wt % to about 10 wt %, from about 0.001 wt % to about 9 wt %, from about 0.001 wt % to about 8 wt %, from about 0.001 wt % to about 7 wt %, from about 0.001 wt % to about 6 wt %, from about 0.001 wt % to about 5 wt %, from about 0.001 wt % to about 4 wt %, from about 0.001 wt % to about 3 wt %, from about 0.001 wt % to about 2 wt %, from about 0.001 wt % to about 1 wt %, from about 0.1 wt % to about 10 wt %, from about 0.1 wt % to about 9 wt %, from about 0.1 wt % to about 8 wt %, from about 0.1 wt % to about 7 wt %, from about 0.1 wt % to about 6 wt %, from about 0.1 wt % to about 5 wt %, from about 0.1 wt % to about 4 wt %, from about 0.1 wt % to about 3 wt %, from about 0.1 wt % to about 2 wt %, from about 0.1 wt % to about 1 wt %, from about 0.25 wt % to about 10 wt %, from about 0.25 wt % to about 9 wt %, from about 0.25 wt % to about 8 wt %, from about 0.25 wt % to about 7 wt %, from about 0.25 wt % to about 6 wt %, from about 0.25 wt % to about 5 wt %, from about 0.25 wt % to about 4 wt %, from about 0.25 wt % to about 3 wt %, from about 0.25 wt % to about 2 wt %, from about 0.25 wt % to about 1 wt %, from about 0.5 wt % to about 10 wt %, from about 0.5 wt % to about 9 wt %, from about 0.5 wt % to about 8 wt %, from about 0.5 wt % to about 7 wt %, from about 0.5 wt % to about 6 wt %, from about 0.5 wt % to about 5 wt %, from about 0.5 wt % to about 4 wt %, from about 0.5 wt % to about 3 wt %, from about 0.5 wt % to about 2 wt %, or from about 0.5 wt % to about 1 wt %, based on the amount of the hydrate inhibitor in the solution. The dispersing agent can be contacted with the aqueous fluid at a concentration of from about 0.5 wt % to about 1 wt % based on the amount of the hydrate inhibitor in the solution.

The dispersing agent can be formulated with other agents known in the art for this application. For example, the dispersing agent can further be administered in conjunction with or formulated with and a component selected from the group consisting of an organic solvent, a corrosion inhibitor, an asphaltene inhibitor, a paraffin inhibitor, a scale inhibitor, an emulsifier, a water clarifier, a dispersant, an emulsion breaker, a biocide, a pH modifier, a surfactant, and a combination thereof.

The dispersing agent composition can comprise from about 20 to about 90 wt. % of dispersing agent and from about 10 to about 80 wt. % of the component, preferably from about 50 to about 90 wt. % of one or more dispersing agents and from about 10 to about 50 wt. % of the component, and more preferably from about 65 to about 85 wt. % of one or more dispersing agents and from about 15 to about 35 wt. % of the component.

The component of the composition can comprise an organic solvent. The composition can comprise from about 1 to 80 wt. %, from about 5 to 50 wt. %, or from about 10 to 35 wt. % of the one or more organic solvents, based on total weight of the composition. The organic solvent can comprise an alcohol, a hydrocarbon, a ketone, an ether, an alkylene glycol, a glycol ether, an amide, a nitrile, a sulfoxide, an ester, or a combination thereof. Examples of suitable organic solvents include, but are not limited to, methanol, ethanol, propanol, isopropanol, butanol, 2-ethylhexanol, hexanol, octanol, decanol, 2-butoxyethanol, methylene glycol, ethylene glycol, 1,2-propylene glycol, 1,3-propylene glycol, diethyleneglycol monomethyl ether, diethylene glycol monoethyl ether, ethylene glycol monobutyl ether, ethylene glycol dibutyl ether, pentane, hexane, cyclohexane, methylcyclohexane, heptane, decane, dodecane, diesel, toluene, xylene, heavy aromatic naphtha, cyclohexanone, diisobutylketone, diethyl ether, propylene carbonate, N-methylpyrrolidinone, N,N-dimethylformamide, or a combination thereof.

The component of the composition can comprise a corrosion inhibitor. The composition can comprise from about 0.1 to 20 wt. %, 0.1 to 10 wt. %, or 0.1 to 5 wt. % of the corrosion inhibitors, based on total weight of the composition. A composition can comprise from 0.1 to 10 percent by weight of the corrosion inhibitors, based on total weight of the composition. The composition can comprise 1.0 wt %, 1.5 wt %, 2.0 wt %, 2.5 wt %, 3.0 wt %, 3.5 wt %, 4.0 wt %, 4.5 wt %, 5.0 wt %, 5.5 wt %, 6.0 wt %, 6.5 wt %, 7.0 wt %, 7.5 wt %, 8.0 wt %, 8.5 wt %, 9.0 wt %, 9.5 wt %, 10.0 wt %, 10.5 wt %, 11.0 wt %, 11.5 wt %, 12.0 wt %, 12.5 wt %, 13.0 wt %, 13.5 wt %, 14.0 wt %, 14.5 wt %, or 15.0 wt % by weight of the corrosion inhibitors, based on total weight of the composition. Each system can have its own requirements, and the weight percent of one or more additional corrosion inhibitors in the composition can vary with the system in which it is used.

The corrosion inhibitor can comprise an imidazoline compound, a quaternary ammonium compound, a pyridinium compound, or a combination thereof.

The corrosion inhibitor component can comprise an imidazoline. The imidazoline can be, for example, imidazoline derived from a diamine, such as ethylene diamine (EDA), diethylene triamine (DETA), triethylene tetraamine (TETA) etc. and a long chain fatty acid such as tall oil fatty acid (TOFA). The imidazoline can be an imidazoline of Formula (I) or an imidazoline derivative. Representative imidazoline derivatives include an imidazolinium compound of Formula (II) or a bis-quaternized compound of Formula (III).

The corrosion inhibitor component can include an imidazoline of Formula (I):

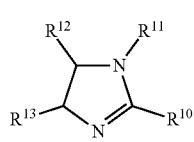

(I)

wherein $R^{10}$ is a $C_1$-$C_{20}$ alkyl or a $C_1$-$C_{20}$ alkoxyalkyl group; $R^{11}$ is hydrogen, $C_1$-$C_6$ alkyl, $C_1$-$C_6$ hydroxyalkyl, or $C_1$-$C_6$ arylalkyl; and $R^{12}$ and $R^{13}$ are independently hydrogen or a $C_1$-$C_6$ alkyl group. Preferably, the imidazoline includes an $R^{10}$ which is the alkyl mixture typical in tall oil fatty acid (TOFA), and $R^{11}$, $R^{12}$ and $R^{13}$ are each hydrogen.

The corrosion inhibitor component can include an imidazolinium compound of Formula (II):

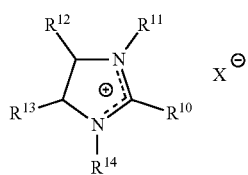

(II)

wherein $R^{10}$ is a $C_1$-$C_{20}$ alkyl or a $C_1$-$C_{20}$ alkoxyalkyl group; $R^{11}$ and $R^{14}$ are independently hydrogen, $C_1$-$C_6$ alkyl, $C_1$-$C_6$ hydroxyalkyl, or $C_1$-$C_6$ arylalkyl; $R^{12}$ and $R^{13}$ are independently hydrogen or a $C_1$-$C_6$ alkyl group; and $X^-$ is a halide (such as chloride, bromide, or iodide), carbonate, sulfonate, phosphate, or the anion of an organic carboxylic acid (such as acetate). Preferably, the imidazolinium compound includes 1-benzyl-1-(2-hydroxyethyl)-2-tall-oil-2-imidazolinium chloride.

The corrosion inhibitor can comprise a bis-quaternized compound having the formula (III):

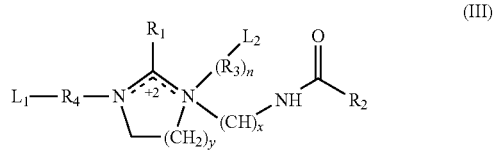

(III)

wherein $R_1$ and $R_2$ are each independently unsubstituted branched, chain or ring alkyl or alkenyl having from 1 to about 29 carbon atoms; partially or fully oxygenized, sulfurized, and/or phosphorylized branched, chain, or ring alkyl or alkenyl having from 1 to about 29 carbon atoms; or a combination thereof; $R_3$ and $R_4$ are each independently unsubstituted branched, chain or ring alkylene or alkenylene having from 1 to about 29 carbon atoms; partially or fully oxygenized, sulfurized, and/or phosphorylized branched, chain, or ring alkylene or alkenylene having from 1 to about 29 carbon atoms; or a combination thereof; $L_1$ and $L_2$ are each independently absent, H, —COOH, —SO$_3$H, —PO$_3$H$_2$, —COOR$_5$, —CONH$_2$, —CONHR$_5$, or —CON(R$_5$)$_2$; $R_5$ is each independently a branched or unbranched alkyl, aryl, alkylaryl, alkylheteroaryl, cycloalkyl, or heteroaryl group having from 1 to about 10 carbon atoms; n is 0 or 1, and when n is 0, $L_2$ is absent or H; x is from 1 to about 10; and y is from 1 to about 5. Preferably, $R_1$ and $R_2$ are each independently $C_6$-$C_{22}$ alkyl, $C_8$-$C_{20}$ alkyl, $C_{12}$-$C_{18}$ alkyl, $C_{16}$-$C_{18}$ alkyl, or a combination thereof; $R_3$ and $R_4$ are $C_1$-$C_{10}$ alkylene, $C_2$-$C_8$ alkylene, $C_2$-$C_6$ alkylene, or $C_2$-$C_3$ alkylene; n is 0 or 1; x is 2; y is 1; $R_3$ and $R_4$ are —C$_2$H$_2$—; $L_1$ is —COOH, —SO$_3$H, or —PO$_3$H$_2$; and $L_2$ is absent, H, —COOH, —SO$_3$H, or —PO$_3$H$_2$. For example, $R_1$ and $R_2$ can be derived from a mixture of tall oil fatty acids and are predominantly a mixture of $C_{17}H_{33}$ and $C_{17}H_{31}$ or can be $C_{16}$-$C_{18}$ alkyl; $R_3$ and $R_4$ can be $C_2$-$C_3$ alkylene such as —C$_2$H$_2$—; n is 1 and $L_2$ is —COOH or n is 0 and $L_2$ is absent or H; x is 2; y is 1; $R_3$ and $R_4$ are —C$_2$H$_2$—; and $L_1$ is —COOH.

It should be appreciated that the number of carbon atoms specified for each group of formula (III) refers to the main chain of carbon atoms and does not include carbon atoms that can be contributed by substituents.

The corrosion inhibitor component can comprise a bis-quaternized imidazoline compound having the formula (III) wherein $R_1$ and $R_2$ are each independently $C_6$-$C_{22}$ alkyl, $C_8$-$C_{20}$ alkyl, $C_{12}$-$C_{18}$ alkyl, or $C_{16}$-$C_{18}$ alkyl or a combination thereof; $R_4$ is $C_1$-$C_{10}$ alkylene, $C_2$-$C_8$ alkylene, $C_2$-$C_6$ alkylene, or $C_2$-$C_3$ alkylene; x is 2; y is 1; n is 0; $L_1$ is —COOH, —SO$_3$H, or —PO$_3$H$_2$; and $L_2$ is absent or H. Preferably, a bis-quaternized compound has the formula (III) wherein $R_1$ and $R_2$ are each independently $C_{16}$-$C_{18}$ alkyl; $R_4$ is —C$_2$H$_2$—; x is 2; y is 1; n is 0; $L_1$ is —COOH, —SO$_3$H, or —PO$_3$H$_2$ and $L_2$ is absent or H.

The corrosion inhibitor component can be a quaternary ammonium compound of Formula (IV):

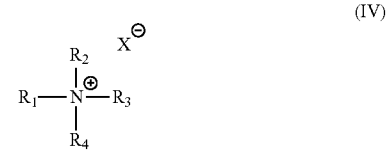

(IV)

wherein $R_1$, $R_2$, and $R_3$ are independently $C_1$ to $C_{20}$ alkyl, $R_4$ is methyl or benzyl, and $X^-$ is a halide or methosulfate.

Suitable alkyl, hydroxyalkyl, alkylaryl, arylalkyl or aryl amine quaternary salts include those alkylaryl, arylalkyl and aryl amine quaternary salts of the formula $[N^+R^{5a}R^{6a}R^{7a}R^{8a}][X^-]$ wherein $R^{5a}$, $R^{6a}$, $R^{7a}$, and $R^{8a}$ contain one to 18 carbon atoms, and X is Cl, Br or I. For the quaternary salts, $R^{5a}$, $R^{6a}$, $R^{7a}$, and $R^{8a}$ can each be independently selected from the group consisting of alkyl (e.g., $C_1$-$C_{18}$ alkyl), hydroxyalkyl (e.g., $C_1$-$C_{18}$ hydroxyalkyl), and arylalkyl (e.g., benzyl). The mono or polycyclic aromatic amine salt with an alkyl or alkylaryl halide include salts of the formula $[N^+R^{5a}R^{6a}R^{7a}R^{8a}][X^-]$ wherein $R^{5a}$, $R^{6a}$, $R^{7a}$, and $R^{8a}$ contain one to 18 carbon atoms and at least one aryl group, and X is Cl, Br or I.

Suitable quaternary ammonium salts include, but are not limited to, a tetramethyl ammonium salt, a tetraethyl ammonium salt, a tetrapropyl ammonium salt, a tetrabutyl ammonium salt, a tetrahexyl ammonium salt, a tetraoctyl ammonium salt, a benzyltrimethyl ammonium salt, a benzyltriethyl ammonium salt, a phenyltrimethyl ammonium salt, a phenyltriethyl ammonium salt, a cetyl benzyldimethyl ammonium salt, a hexadecyl trimethyl ammonium salt, a dimethyl alkyl benzyl quaternary ammonium salt, a monomethyl dialkyl benzyl quaternary ammonium salt, or a trialkyl benzyl quaternary ammonium salt, wherein the alkyl group has about 6 to about 24 carbon atoms, about 10 and about 18 carbon atoms, or about 12 to about 16 carbon atoms. The quaternary ammonium salt can be a benzyl trialkyl quaternary ammonium salt, a benzyl triethanolamine quaternary ammonium salt, or a benzyl dimethylaminoethanolamine quaternary ammonium salt.

The corrosion inhibitor component can comprise a pyridinium salt such as those represented by Formula (V):

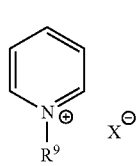

(V)

wherein $R^9$ is an alkyl group, an aryl group, or an arylalkyl group, wherein said alkyl groups have from 1 to about 18 carbon atoms and $X^-$ is a halide such as chloride, bromide, or iodide. Among these compounds are alkyl pyridinium salts and alkyl pyridinium benzyl quats. Exemplary compounds include methyl pyridinium chloride, ethyl pyridinium chloride, propyl pyridinium chloride, butyl pyridinium chloride, octyl pyridinium chloride, decyl pyridinium chloride, lauryl pyridinium chloride, cetyl pyridinium chloride, benzyl pyridinium chloride and an alkyl benzyl pyridinium chloride, preferably wherein the alkyl is a $C_1$-$C_6$ hydrocarbyl group. Preferably, the pyridinium compound includes benzyl pyridinium chloride.

The corrosion inhibitor components can include additional corrosion inhibitors such as phosphate esters, monomeric or oligomeric fatty acids, or alkoxylated amines.

The corrosion inhibitor component can comprise a phosphate ester. Suitable mono-, di- and tri-alkyl as well as alkylaryl phosphate esters and phosphate esters of mono, di, and triethanolamine typically contain between from 1 to about 18 carbon atoms. Preferred mono-, di- and trialkyl phosphate esters, alkylaryl or arylalkyl phosphate esters are those prepared by reacting a $C_3$-$C_{18}$ aliphatic alcohol with phosphorous pentoxide. The phosphate intermediate interchanges its ester groups with triethylphosphate producing a more broad distribution of alkyl phosphate esters.

Alternatively, the phosphate ester can be made by admixing with an alkyl diester, a mixture of low molecular weight alkyl alcohols or diols. The low molecular weight alkyl alcohols or diols preferably include $C_6$ to $C_{10}$ alcohols or diols. Further, phosphate esters of polyols and their salts containing one or more 2-hydroxyethyl groups, and hydroxylamine phosphate esters obtained by reacting polyphosphoric acid or phosphorus pentoxide with hydroxylamines such as diethanolamine or triethanolamine are preferred.

The corrosion inhibitor component can include a monomeric or oligomeric fatty acid. Preferred monomeric or oligomeric fatty acids are $C_{14}$-$C_{22}$ saturated and unsaturated fatty acids as well as dimer, trimer and oligomer products obtained by polymerizing one or more of such fatty acids.

The corrosion inhibitor component can comprise an alkoxylated amine. The alkoxylated amine can be an ethoxylated alkyl amine. The alkoxylated amine can be ethoxylated tallow amine.

The component of the composition can comprise an organic sulfur compound, such as a mercaptoalkyl alcohol, mercaptoacetic acid, thioglycolic acid, 3,3'-dithiodipropionic acid, sodium thiosulfate, thiourea, L-cysteine, tert-butyl mercaptan, sodium thiosulfate, ammonium thiosulfate, sodium thiocyanate, ammonium thiocyanate, sodium metabisulfite, or a combination thereof. Preferably, the mercaptoalkyl alcohol comprises 2-mercaptoethanol. The organic sulfur compound can constitute 0.5 to 15 wt. % of the composition, based on total weight of the composition, preferably about 1 to about 10 wt. % and more preferably about 1 to about 5 wt. %. The organic sulfur compound can constitute 1, 2, 3, 4, 5, 6, 7, 8, 9, 10, 11, 12, 13, 14 or 15 wt. % of the composition.

The composition can be substantially free of or free of any organic sulfur compound. A composition is substantially free of any organic sulfur compound if it contains an amount of organic sulfur compound below the amount that will produce hydrogen sulfide gas upon storage at a temperature of 25° C. and ambient pressure.

The component of the composition can further include a demulsifier. Preferably, the demulsifier comprises an oxyalkylate polymer, such as a polyalkylene glycol. The demulsifier can constitute from about 0.1 to 10 wt. %, from about 0.5 to 5 wt. %, or from about 0.5 to 4 wt. % of the composition, based on total weight of the composition. The demulsifier can constitute 0.5, 1, 1.5, 2, 2.5, 3, 3.5, 4, 4.5 or 5 wt. % of the composition.

The component of the composition can include an asphaltene inhibitor. The composition can comprise from about 0.1 to 10 wt. %, from about 0.1 to 5 wt. %, or from about 0.5 to 4 wt. % of an asphaltene inhibitor, based on total weight of the composition. Suitable asphaltene inhibitors include, but are not limited to, aliphatic sulfonic acids; alkyl aryl sulfonic acids; aryl sulfonates; lignosulfonates; alkylphenol/aldehyde resins and similar sulfonated resins; polyolefin esters; polyolefin imides; polyolefin esters with alkyl, alkylenephenyl or alkylenepyridyl functional groups; polyolefin amides; polyolefin amides with alkyl, alkylenephenyl or alkylenepyridyl functional groups; polyolefin imides with alkyl, alkylenephenyl or alkylenepyridyl functional groups; alkenyl/vinyl pyrrolidone copolymers; graft polymers of polyolefins with maleic anhydride or vinyl imidazole; hyperbranched polyester amides; polyalkoxylated asphaltenes, amphoteric fatty acids, salts of alkyl succinates, sorbitan monooleate, and polyisobutylene succinic anhydride.

The component of the composition can include an additional paraffin inhibitor. The composition can comprise from about 0.1 to 10 wt. %, from about 0.1 to 5 wt. %, or from about 0.5 to 4 wt. % of an additional paraffin inhibitor, based on total weight of the composition. Suitable additional paraffin inhibitors include, but are not limited to, paraffin crystal modifiers, and dispersant/crystal modifier combinations. Suitable paraffin crystal modifiers include, but are not limited to, alkyl acrylate copolymers, alkyl acrylate vinylpyridine copolymers, ethylene vinyl acetate copolymers, maleic anhydride ester copolymers, branched polyethylenes, naphthalene, anthracene, microcrystalline wax and/or asphaltenes. Suitable paraffin dispersants include, but are not limited to, dodecyl benzene sulfonate, oxyalkylated alkylphenols, and oxyalkylated alkylphenolic resins.

The component of the composition can include a scale inhibitor. The composition can comprise from about 0.1 to 20 wt. %, from about 0.5 to 10 wt. %, or from about 1 to 10 wt. % of a scale inhibitor, based on total weight of the composition. Suitable scale inhibitors include, but are not limited to, phosphates, phosphate esters, phosphoric acids, phosphonates, phosphonic acids, polyacrylamides, salts of acrylamidomethyl propane sulfonate/acrylic acid copolymer (AMPS/AA), phosphinated maleic copolymer (PHOS/MA), and salts of a polymaleic acid/acrylic acid/acrylamidomethyl propane sulfonate terpolymer (PMA/AA/AMPS).

The component of the composition can include an emulsifier. The composition can comprise from about 0.1 to 10 wt. %, from about 0.5 to 5 wt. %, or from about 0.5 to 4 wt. % of an emulsifier, based on total weight of the composition. Suitable emulsifiers include, but are not limited to, salts of carboxylic acids, products of acylation reactions between carboxylic acids or carboxylic anhydrides and amines, and alkyl, acyl and amide derivatives of saccharides (alkylsaccharide emulsifiers).

The component of the composition can include a water clarifier. The composition can comprise from about 0.1 to 10 wt. %, from about 0.5 to 5 wt. %, or from about 0.5 to 4 wt. % of a water clarifier, based on total weight of the composition. Suitable water clarifiers include, but are not limited to, inorganic metal salts such as alum, aluminum chloride, and aluminum chlorohydrate, or organic polymers such as acrylic acid based polymers, acrylamide based polymers, polymerized amines, alkanolamines, thiocarbamates, and cationic polymers such as diallyldimethylammonium chloride (DADMAC).

The component of the composition can include a dispersant. The composition can comprise from about 0.1 to 10 wt. %, from about 0.5 to 5 wt. %, or from about 0.5 to 4 wt. % of a dispersant, based on total weight of the composition. Suitable dispersants include, but are not limited to, aliphatic phosphonic acids with 2-50 carbons, such as hydroxyethyl diphosphonic acid, and aminoalkyl phosphonic acids, e.g. polyaminomethylene phosphonates with 2-10 N atoms e.g. each bearing at least one methylene phosphonic acid group; examples of the latter are ethylenediamine tetra(methylene phosphonate), diethylenetriamine penta(methylene phosphonate), and the triamine- and tetramine-polymethylene phosphonates with 2-4 methylene groups between each N atom, at least 2 of the numbers of methylene groups in each phosphonate being different. Other suitable dispersion agents include lignin, or derivatives of lignin such as lignosulfonate and naphthalene sulfonic acid and derivatives.

The component of the composition can include an emulsion breaker. The composition can comprise from about 0.1 to 10 wt. %, from about 0.5 to 5 wt. %, or from about 0.5 to 4 wt. % of an emulsion breaker, based on total weight of the composition. Suitable emulsion breakers include, but are not limited to, dodecylbenzylsulfonic acid (DDBSA), the sodium salt of xylenesulfonic acid (NAXSA), epoxylated and propoxylated compounds, anionic, cationic and nonionic surfactants, and resins, such as phenolic and epoxide resins.

The component of the composition can include a hydrogen sulfide scavenger. The composition can comprise from about 1 to 50 wt. %, from about 1 to 40 wt. %, or from about 1 to 30 wt. % of a hydrogen sulfide scavenger, based on total weight of the composition. Suitable additional hydrogen sulfide scavengers include, but are not limited to, oxidants (e.g., inorganic peroxides such as sodium peroxide or chlorine dioxide); aldehydes (e.g., of 1-10 carbons such as formaldehyde, glyoxal, glutaraldehyde, acrolein, or methacrolein; triazines (e.g., monoethanolamine triazine, monomethylamine triazine, and triazines from multiple amines or mixtures thereof); condensation products of secondary or tertiary amines and aldehydes, and condensation products of alkyl alcohols and aldehydes.

The component of the composition can include a biocide. The composition can comprise from about 0.1 to 10 wt. %, from about 0.5 to 5 wt. %, or from about 0.5 to 4 wt. % of a biocide, based on total weight of the composition. Suitable biocides include, but are not limited to, oxidizing and non-oxidizing biocides. Suitable non-oxidizing biocides include, for example, aldehydes (e.g., formaldehyde, glutaraldehyde, and acrolein), amine-type compounds (e.g., quaternary amine compounds and cocodiamine), halogenated compounds (e.g., 2-bromo-2-nitropropane-3-diol (Bronopol) and 2-2-dibromo-3-nitrilopropionamide (DBNPA)), sulfur compounds (e.g., isothiazolone, carbamates, and metronidazole), and quaternary phosphonium salts (e.g., tetrakis(hydroxymethyl)-phosphonium sulfate (THPS)). Suitable oxidizing biocides include, for example, sodium hypochlorite, trichloroisocyanuric acids, dichloroisocyanuric acid, calcium hypochlorite, lithium hypochlorite, chlorinated hydantoins, stabilized sodium hypobromite, activated sodium bromide, brominated hydantoins, chlorine dioxide, ozone, and peroxides.

The component of the composition can include a pH modifier. The composition can comprise from about 0.1 to 20 wt. %, from about 0.5 to 10 wt. %, or from about 0.5 to 5 wt. % of a pH modifier, based on total weight of the composition. Suitable pH modifiers include, but are not limited to, alkali hydroxides, alkali carbonates, alkali bicarbonates, alkaline earth metal hydroxides, alkaline earth metal carbonates, alkaline earth metal bicarbonates and mixtures or combinations thereof. Exemplary pH modifiers include sodium hydroxide, potassium hydroxide, calcium hydroxide, calcium oxide, sodium carbonate, potassium carbonate, sodium bicarbonate, potassium bicarbonate, magnesium oxide, and magnesium hydroxide.

The component of the composition can include a surfactant. The composition can comprise from about 0.1 to 10 wt. %, from about 0.5 to 5 wt. %, or from about 0.5 to 4 wt. % of a surfactant, based on total weight of the composition. Suitable surfactants include, but are not limited to, anionic surfactants and nonionic surfactants. Anionic surfactants include alkyl aryl sulfonates, olefin sulfonates, paraffin sulfonates, alcohol sulfates, alcohol ether sulfates, alkyl carboxylates and alkyl ether carboxylates, and alkyl and ethoxylated alkyl phosphate esters, and mono and dialkyl sulfosuccinates and sulfosuccinamates. Nonionic surfactants include alcohol alkoxylates, alkylphenol alkoxylates, block copolymers of ethylene, propylene and butylene oxides, alkyl dimethyl amine oxides, alkyl-bis(2-hydroxyethyl) amine oxides, alkyl amidopropyl dimethyl amine oxides, alkylamidopropyl-bis(2-hydroxyethyl) amine oxides, alkyl polyglucosides, polyalkoxylated glycerides, sorbitan esters and polyalkoxylated sorbitan esters, and alkoyl polyethylene glycol esters and diesters. Also included are betaines and sultanes, amphoteric surfactants such as alkyl amphoacetates and amphodiacetates, alkyl amphopropionates and amphodipropionates, and alkyliminodipropionate.

Paraffin inhibitor compositions can further include additional functional agents or additives that provide a beneficial property. For example, additional agents or additives can be sequestrants, solubilizers, lubricants, buffers, cleaning agents, rinse aids, preservatives, binders, thickeners or other viscosity modifiers, processing aids, carriers, water-conditioning agents, foam inhibitors or foam generators, threshold agents or systems, aesthetic enhancing agents (i.e., dyes, odorants, perfumes), or other additives suitable for formulation with a corrosion inhibitor composition, and mixtures thereof. Additional agents or additives will vary according to the particular corrosion inhibitor composition being manufactured and its intend use as one skilled in the art will appreciate.

Alternatively, the compositions can not contain any of the additional agents or additives.

Additionally, the dispersing agent can be formulated into a treatment fluid comprising the following components. These formulations include the ranges of the components listed and can optionally include additional agents.

The terms "aryl" or "ar" as used herein alone or as part of another group (e.g., aralkyl) denote optionally substituted homocyclic aromatic groups, preferably monocyclic or bicyclic groups containing from 6 to 12 carbons in the ring portion, such as phenyl, biphenyl, naphthyl, substituted phenyl, substituted biphenyl or substituted naphthyl. Phenyl and substituted phenyl are the more preferred aryl. The term "aryl" also includes heteroaryl.

The term "substituted" as in "substituted aryl," "substituted alkyl," and the like, means that in the group in question (i.e., the alkyl, aryl or other group that follows the term), at least one hydrogen atom bound to a carbon atom is replaced with one or more substituent groups such as hydroxy (—OH), alkylthio, phosphino, amido (—CON($R_A$)($R_B$), wherein $R_A$ and $R_B$ are independently hydrogen, alkyl, or aryl), amino(—N($R_A$)($R_B$), wherein $R_A$ and $R_B$ are independently hydrogen, alkyl, or aryl), halo (fluoro, chloro, bromo, or iodo), silyl, nitro (—$NO_2$), an ether (—$OR_A$ wherein $R_A$ is alkyl or aryl), an ester (—OC(O)$R_A$ wherein $R_A$ is alkyl or aryl), keto (—C(O)$R_A$ wherein $R_A$ is alkyl or aryl), heterocyclo, and the like. When the term "substituted" introduces a list of possible substituted groups, it is intended that the term apply to every member of that group. That is, the phrase "optionally substituted alkyl or aryl" is to be interpreted as "optionally substituted alkyl or optionally substituted aryl."

The term "heterocyclo," "heterocycle," or "heterocyclyl," as used herein, refers to a monocyclic, bicyclic, or tricyclic group containing 1 to 4 heteroatoms selected from N, O, $S(O)_n$, $P(O)_n$, $PR^Z$, NH or $NR^Z$, wherein $R^Z$ is a suitable substituent. Heterocyclic groups optionally contain one or two double bonds. Heterocyclic groups include, but are not limited to, azetidinyl, tetrahydrofuranyl, imidazolidinyl,

| Component | 1 | 2 | 3 | 4 | 5 | 6 | 7 | 8 | 9 | 10 | 11 | 12 |
|---|---|---|---|---|---|---|---|---|---|---|---|---|
| Dispersing agent | 30-90 | 30-90 | 30-90 | 30-90 | 30-90 | 30-90 | 65-85 | 65-85 | 65-85 | 65-85 | 65-85 | 30-90 |
| Organic solvent | 10-35 | | | | | | 10-35 | | | | | 10-35 |
| Corrosion inhibitor | 0.1-20 | | | | | | 0.1-20 | 0.1-20 | | | | 0.1-20 |
| Asphaltene inhibitor | 0.1-5 | 0.1-5 | 0.1-5 | 0.1-5 | | | 0.1-5 | 0.1-5 | 0.1-5 | | | 0.1-5 |
| Scale inhibitor | 1-10 | 1-10 | 1-10 | 1-10 | 1-10 | | 1-10 | 1-10 | 1-10 | 1-10 | | 1-10 |
| Gas hydrate inhibitor | | | | | | | | | | | | 0.1-25 |
| Biocide | 0.5-5 | 0.5-5 | 0.5-5 | 0.5-5 | 0.5-5 | 0.5-5 | 0.5-5 | 0.5-5 | 0.5-5 | 0.5-5 | 0.5-5 | |

| Component | 13 | 14 | 15 | 16 | 17 | 18 | 19 | 20 | 21 | 22 | 23 | 24 |
|---|---|---|---|---|---|---|---|---|---|---|---|---|
| Dispersing agent | 30-90 | 30-90 | 30-90 | 30-90 | 30-90 | 30-90 | 65-85 | 65-85 | 65-85 | 65-85 | 65-85 | 65-85 |
| Organic solvent | | | | | | | | | | | | |
| Corrosion inhibitor | 0.1-20 | 0.1-20 | 0.1-20 | 0.1-20 | 0.1-20 | 0.1-20 | 0.1-20 | 0.1-20 | 0.1-20 | 0.1-20 | 0.1-20 | 0.1-20 |
| Asphaltene inhibitor | 0.1-5 | | | | | | 0.1-5 | | | | | |
| Scale inhibitor | | 1-10 | | | 1-10 | | 1-10 | 1-10 | | | | 1-10 |
| Gas hydrate inhibitor | 0.1-25 | 0.1-25 | 0.1-25 | | | | 0.1-25 | 0.1-25 | 0.1-25 | | 0.1-25 | |
| Biocide | | | | | | 0.5-5 | 0.5-5 | 0.5-5 | 0.5-5 | 0.5-5 | | |

Unless otherwise indicated, an alkyl group as described herein alone or as part of another group is an optionally substituted linear saturated monovalent hydrocarbon substituent containing from one to sixty carbon atoms and preferably one to thirty carbon atoms in the main chain or eight to thirty carbon atoms in the main chain, or an optionally substituted branched saturated monovalent hydrocarbon substituent containing three to sixty carbon atoms, and preferably eight to thirty carbon atoms in the main chain. Examples of unsubstituted alkyl groups include methyl, ethyl, n-propyl, i-propyl, n-butyl, i-butyl, s-butyl, t-butyl, n-pentyl, i-pentyl, s-pentyl, t-pentyl, and the like.

The term alkoxy as used herein or alone or as part of another group is an —OR group, wherein the R group is a substitued or unsubstituted alkyl group as defined herein.

pyrrolidinyl, piperidinyl, piperazinyl, oxazolidinyl, thiazolidinyl, pyrazolidinyl, thiomorpholinyl, tetrahydrothiazinyl, tetrahydro-thiadiazinyl, morpholinyl, oxetanyl, tetrahydrodiazinyl, oxazinyl, oxathiazinyl, indolinyl, isoindolinyl, quinuclidinyl, chromanyl, isochromanyl, and benzoxazinyl. Examples of monocyclic saturated or partially saturated ring systems are tetrahydrofuran-2-yl, tetrahydrofuran-3-yl, imidazolidin-1-yl, imidazolidin-2-yl, imidazolidin-4-yl, pyrrolidin-1-yl, pyrrolidin-2-yl, pyrrolidin-3-yl, piperidin-1-yl, piperidin-2-yl, piperidin-3-yl, piperazin-1-yl, piperazin-2-yl, piperazin-3-yl, 1,3-oxazolidin-3-yl, isothiazolidine, 1,3-thiazolidin-3-yl, 1,2-pyrazolidin-2-yl, 1,3-pyrazolidin-1-yl, thiomorpholin-yl, 1,2-tetrahydrothiazin-2-yl, 1,3-tetrahydrothiazin-3-yl, tetrahydrothiadiazin-yl, morpholinyl, 1,2- tetrahydrodiazin-2-yl, 1,3-tetrahydrodiazin-1-yl, 1,4-oxazin-2-yl, and 1,2,5-oxathiazin-4-yl. Heterocyclic groups can be unsubstituted or substituted by one or more suitable substituents, preferably 1 to 3 suitable substituents, as defined above.

Having described the invention in detail, it will be apparent that modifications and variations are possible without departing from the scope of the invention defined in the appended claims.

EXAMPLES

The following non-limiting examples are provided to further illustrate the present invention.

Example 1: Hot Injection Tests

Hot injection tests were performed to assess the dispersibility of a KHI in the presence of various chemicals known to disperse or solubilize fouled polymers. The tests were performed at two different concentrations of KHI in brine: 0.50 vol % and 1.75 vol %. The brine was heated to 60° C., dosed with KHI, and stirred at 750 rpm for 1 hour. The chemical treatment was added to the vial and allowed to stir for another 1 hour. Occasionally, additional chemical treatment was added to probe for step change improvement or additional time was allowed to ensure homogeneity. The treatment was considered successful if (1) all precipitated solution-based (non-deposited) KHI polymer was uniformly dispersed at 60° C. and (2) any deposited solids, generally at the air-water interface, were uniformly removed and dispersed at 60° C.

The chemistry tested included Composition A (a hydrocarbon solvent including aliphatic mineral spirits commercially available as Flotron® D1340 from Nalco Champion), Composition B (an alkyl dimethyl benzyl quaternary amine in isopropyl alcohol commercially available as PR-9010 from Nalco Champion), Composition C (a polyethylene glycol/polypropylene glycol alkyl ether polymer in water derived from adding ethylene oxide and propylene oxide to alkyl alcohols commercially available as PR-9012 from Nalco Champion).

Table 1 indicates the results of the test at 0.50 vol % KHI.

TABLE 1

| Chemistry | Dose Tested (vol %) | Solution Clarity | Polymer Precipitation |
|---|---|---|---|
| Blank | NA | Slightly hazy | Major, interface |
| Composition A | 1% | Slightly hazy | Minor, interface |
| Diglyme | 1% | Hazy | Bottom of vial |
| Ethylene glycol monoethyl ether (EDGE) | 1% | Clear | Very minor, interface |
| Ethylene glycol monobutyl ether (EGMBE) | 1% | Hazy | Minor, interface |
| Ethylene glycol | 1% | Clear | Minor, interface |
| 2-ethylhexanol | 1% | Hazy | Very minor, interface |
| Methanol | 1% | Clear | Minor, interface |
| Methoxypolyethylene glylcol, ave MW 350 (MPEG 350) | 1% | Clear | Large floc in solution and bottom of vial |
| Composition B | 1% | Clear | Bottom of vial |
| Propylene glycol diacetate | 1% | Slightly hazy | Bottom of vial |

TABLE 1-continued

| Chemistry | Dose Tested (vol %) | Solution Clarity | Polymer Precipitation |
|---|---|---|---|
| Sodium dodecyl sulfate (SDS) solution (30% in water) | 1% | Clear | No solids |
| p-toluenesulfonic acid, $K^+$ salt | 1% | Very slight haze | Minor, interface |
| Triethyl 2-acetylcitrate | 1% | Very hazy | Minor, interface |

As can be seen from the results in Table 1, SDS solution shows strong dispersant behavior with minimal foaming even at high stir speed. Promising results were also noted with Composition B and EDGE. None of the solutions contained solids at room temperature post-test.

Based on the success on the dispersant trials at 0.50 vol %, a second series of chemical treatments was tested for capability to remove and disperse a KHI at 60° C. and 1.75 vol % KHI. Since the amount of KHI was much higher, the dose was measured or titrated in to assess the minimum effective dose, if any. Results of this test are indicated in Table 2.

TABLE 2

| Chemistry | Maximum Dose Tested (vol %) | Solution Clarity | Polymer Precipitation |
|---|---|---|---|
| Blank | — | Slightly hazy | Major, interface |
| EDGE | 12% | Hazy | Minor, interface |
| EGMBE | 2% | Very hazy | Strong, interface |
| Ethylene glycol | 2% | Hazy | Minor, interface |
| Methanol | 2% | Hazy | Floc + minor, interface |
| Composition B | 4% | Clear | Very minor, interface |
| Composition C | 1% | Very hazy | Floc in solution + interface |
| SDS solution (30% in water) | 4%* | Clear | None (some non-solid containing foam) |

*Note that effective dose was 3%. An additional 1% was added to probe the effects of overtreatment.

The SDS solution exhibited the best results. Treatments with solid SDS did not show as strong of an effect (although increasing dosage was not attempted). Composition B at 4% dose could not overcome minor amounts of polymer at the air/water interface, and EDGE dosing, even at very high levels (12%) could not clarify the solution as it did at the lower KHI rate. None of the solutions contained solids at room temperature post-test.

Example 2: Solids Dispersion

Test samples were prepared as indicated in Table 3. KHI and dispersing agent were added to a vial. Where included, a corrosion inhibitor (CI) was then added. The vials were heated to 60° C. and stirred at this temperature for 30 minutes. Samples 3A-3D were prepared using high torque stir bars. Samples 5A-5D and 7A-7F were dosed with 0.5% KHI. Samples 6A-6D were dosed with 1.75% KHI. KHI A (a copolymer of N-alkyl(alkyl)acrylamide monomers and one or more cationic monomers in glycol and other solvents is commercially available as HYDT16688A from Nalco Champion), KHI B (a copolymer of N-alkyl(alkyl)acrylamide monomers and one or more cationic monomers in glycol solvent is commercially available as EC6681B from Nalco Champion), and Corrosion Inhibitor A (CI A, a quaternary ammonium compound and substituted aromatic amine based corrosion inhibitor blend is commercially available as EC1617A from Nalco Champion). Observations are indicated in Table 3.

TABLE 3

| Test Sample | Chemistry | KHI | Corrosion Inhibitor | Observations |
|---|---|---|---|---|
| 1A | Control | KHI B | CI A | Gunked out, solids floating |
| VX | Control | KHI A | CI A | No gunk, some CI floating (disperses) |
| 1B | 30% SDS (1000 ppm) | KHI B | CI A | Huge solid chunk and CI aggregate, clearer solution |
| 1C | 30% SDS (5000 ppm) | KHI B | CI A | Huge solid, not much change |
| 1D | 30% SDS (1000 ppm) | KHI A | CI A | Ring at oil/air interface of CI (disperses) |
| 1E | 30% SDS (5000 ppm) | HYDT16688A | CI A | Ring and solids at oil/air interface |
| 1F | 2-ethylhexanol (5000 ppm) | KHI B | CI A | Smear of solids along wall |
| 1G | Composition A (5000 ppm) | KHI B | CI A | Solid clumping at bottom, corrosion inhibitor ring at top |
| 1H | 2-ethylhexanol (5000 ppm) | KHI A | CI A | Minor precipitation at top interface |
| 1I | Composition A (5000 ppm) | KHI A | CI A | Minor CI ring at top (disperses) |
| 2A | Blank | KHI B | CI A | Hazy |
| 2B | 1% SDS added after KHI | KHI B | CI A | Hazy |
| 2C | 1% Composition C (paraffin dispersant) | KHI B | CI A | Hazy with floc |
| 2D | 1% SDS added before KHI | KHI B | CI A | Hazy |
| 2E | 1% EGMBE (addt'l 1% added later) | KHI B | CI A | Very hazy |
| 2F | 1% methanol (addt'l 1% added later) | KHI B | CI A | Hazy with floc |
| 2G | 1% ethylene glycol (addt'l 1% added later) | KHI B | CI A | Hazy |
| 2H | 1.5% of 30% SDS solution | KHI B | CI A | Clear with minor solids on top |
| 3A | Blank + 306 mL KHI | KHI B | CI A | — |
| 3B | 1% EGMBE added before KHI | KHI B | CI A | — |
| 3C | 1% EGMBE added after KHI | KHI B | CI A | — |
| 3D | 0.5% of 30% SDS + 0.5% KHI | KHI B | CI A | — |
| 3E | Blank + 0.5% KHI | KHI B | CI A | — |
| 4A | Composition B at 0.5% then 1% dose | KHI B | CI A | Very clear at 1% dose, solids on bottom |
| 4B | Diethylene glycol butyl ether acetate at 0.5% then 1% dose | KHI B | CI A | Hazy/clear, solids on bottom |
| 4C | Propylene glycol diacetate at 0.5% then 1% dose | KHI B | CI A | Hazy/clear, solids on bottom |
| 4D | MPEG 350 at 0.5% then 1% dose | KHI B | CI A | Clear but large floc |
| 4E | Triethyl 2-acetyl citrate at 0.5% then 1% dose | KHI B | CI A | Hazy |
| 5A | Control | KHI B | CI A | Solids on top |
| 5B | EDGE (0.5%) + EGMBE (0.5%) | KHI B | CI A | Haze and solids |
| 5C | EDGE (0.5%) + SDS (0.5%) | KHI B | CI A | Minor solids, clearer |
| 5D | EGMBE (0.5%) + SDS (0.5%) | KHI B | CI A | Minor solids, more at interface |
| 6A | Control | KHI B | CI A | Major solids at interface |
| 6B | 1% increments of EDGE | KHI B | CI A | Major solids, hazy |
| 6C | 1% increments of SDS | KHI B | CI A | Very clear, foam from shaking/stirring |
| 6D | 1% increments of Composition B | KHI B | CI A | Clear but minor solids on top |
| 7A | Composition A (0.5% + 0.5%) | KHI B | CI A | Solids at interface |
| 7B | 2-ethylhexanol (0.5% + 0.5%) | KHI B | CI A | Hazy, low solids at interface |
| 7C | Methanol (0.5% + 0.5%) | KHI B | CI A | Clear solution but solids at interface |
| 7D | Ethylene glycol (0.5% + 0.5%) | KHI B | CI A | Clear solution but solids at interface |
| 7E | Composition C (0.5% + 0.5%) | KHI B | CI A | Strong haze |
| 7F | Control | KHI B | CI A | Solids on top interface |

Example 3: Solubility Test

In separate trials, 0.25 mL and 0.5 mL of 10% SDS solution were added to 10 mL of KHI (2.5% dose), corrosion inhibitor (0.1% dose) in DI water, 2.5% NaCl, or 5.5% NaCl water/brine for non-sand solutions. The samples were observed for agglomeration. SDS was added at the following times: SDS was added after mixing (sample 1). The solution was heated and to 75° C. and SDS was subsequently added (sample 2). The solution agglomeration was observed immediately upon addition at after 30-60 minutes stirring at 75° C. The solution was cooled to room temperature. After cooling, SDS was added (sample 3). All brines exhibited polymer gunking without SDS.

Sample 1 results. Where DI water was used, the solution remained clear with 0.5 mL SDS added. Slight cloudiness was observed with 0.25 mL SDS. With solutions in 2.5% and 5.5% NaCl, solid agglomeration occurred with 0.25 mL SDS. Samples with 0.5 mL SDS produced a clear liquid.

Sample 2 results. Where DI water was used, the solution remained almost clear with the addition of 0.25 mL SDS. This remained the same after stirring at 75° C. for 1 hour. Where 2.5% and 5.5% NaCl were used, 0.25 mL SDS had no effect. There was no initial effect with 0.5 mL SDS, but the solution cleared after heating for 1 hour at 75° C. with stirring.

Sample 3 results. The DI samples cleared when cooled to room temperature without the addition of SDS. Where 2.5% and 5.5% NaCl were used, the solutions mostly cleared up upon cooling and only required small amounts of SDS to facilitate complete clearing.

Sand effects. Sand caused worse gunking on the bottom of the vial and glued the stir bar to the bottom. DI water solutions cleared upon cooling to room temperature with very slight precipitate. The 2.5% NaCl solutions were almost clear upon cooling. Addition of 0.5 mL SDS had no immediate effect, but the solution cleared upon stirring for 30-60 minutes at 75° C. The 5.5% NaCl solutions exhibited nearly the same results as the 2.5% NaCl solutions, only slightly worse. Both the 2.5% and 5.5% NaCl solutions had very slight precipitate on glass after treating with SDS and stirring.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there can be additional elements other than the listed elements.

In view of the above, it will be seen that the several objects of the invention are achieved and other advantageous results attained.

As various changes could be made in the above methods without departing from the scope of the invention, it is intended that all matter contained in the above description shall be interpreted as illustrative and not in a limiting sense.

What is claimed is:

1. A method for dispersing a polymeric low dose hydrate inhibitor in produced waste water containing the polymeric low dose hydrate inhibitor, the method comprising injecting a dispersing agent into the produced waste water containing the polymeric low dose hydrate inhibitor, and injecting the produced waste water containing the dispersing agent and the polymeric low dose hydrate inhibitor into a well or reservoir, thereby dispersing the polymeric low dose hydrate inhibitor and reducing precipitation of the polymeric low dose hydrate inhibitor, wherein the produced waste water containing the polymeric low dose hydrate inhibitor is present in a separator.

2. The method of claim 1, wherein the dispersing agent is selected from the group consisting of a $C_1$-$C_{20}$ alkyl sulfate, a $C_{10}$-$C_{20}$ alkyl ether sulfate, a $C_{10}$-$C_{20}$ carbonyl sarcosinate, a $C_{10}$-$C_{20}$ alkylbenezene sulfonate, a quaternary-ammonium based corrosion inhibitor, a glycol ether, and a combination thereof.

3. The method of claim 2, wherein the dispersing agent is a $C_1$-$C_{20}$ alkyl sulfate.

4. The method of claim 3, wherein the $C_1$-$C_{20}$ alkyl sulfate has a counter cation selected from the group consisting of sodium, calcium, potassium, magnesium, ammonium, and a combination thereof.

5. The method of claim 4, wherein the counter cation is selected from the group consisting of sodium, potassium, and a combination thereof.

6. The method of claim 4, wherein the dispersing agent comprises sodium dodecyl sulfate.

7. The method of claim 2, wherein the quaternary-ammonium based corrosion inhibitor is selected from the group consisting of benzyl-dimethyl-dodecyl ammonium chloride, benzyl-dimethyl-tetradecyl ammonium chloride, benzyl-dimethyl-hexadecyl ammonium chloride, benzyl-dimethyl-octadecyl ammonium chloride, an alkyl t-butylammonium halide quaternary ammonium salt, and a combination thereof.

8. The method of claim 2, wherein the glycol ether is selected from the group consisting of diethylene glycol monoethyl ether, ethylene glycol monobutyl ether, and a combination thereof.

9. The method of claim 1, wherein the polymeric low dose hydrate inhibitor comprises a polymeric kinetic hydrate inhibitor, an anti-agglomerate hydrate inhibitor, or a combination thereof.

10. The method of claim 9, wherein the polymeric low dose hydrate inhibitor comprises a polymeric kinetic hydrate inhibitor.

11. The method of claim 10, wherein the polymeric kinetic hydrate inhibitor comprises a homopolymer or a copolymer comprising poly(N-vinyl caprolactam), poly(N-vinyl pyrrolidone), 2-trimethylammoniummethyl methacrylate chloride, 3-dimethylaminopropyl methacrylamide, 2-dimethylaminoethyl methacrylate, N-methyl-N-vinylacetamide, poly(N-isopropyl methacrylamide), poly(N-isopropyl methacrylamide-co-3-trimethylammoniumpropyl methacrylamide chloride), or a combination thereof.

12. The method of claim 11, wherein the polymeric kinetic hydrate inhibitor comprises a homopolymer or a copolymer comprising poly(N-vinyl caprolactam), poly(N-vinyl pyrrolidone), or a combination thereof.

13. The method of claim 1, wherein the dispersing agent is injected into the produced waste water the polymeric low dose hydrate inhibitor in the form of a solid or as a solution.

14. The method of claim 13, wherein the dispersing agent is injected into the produced waste water as a solution.

15. The method of claim 14, wherein the dispersing agent is injected into the produced waste water at a concentration of from about 0.001 wt. % to about 10 wt. % based on the amount of the polymeric low dose hydrate inhibitor in the waste water.

16. The method of claim 1, wherein the dispersing agent is injected into the produced waste water containing the polymeric low dose hydrate inhibitor in a batch-wise method.

17. The method of claim 1, wherein the dispersing agent is injected into the produced waste water containing the polymeric low dose hydrate inhibitor in a metered injection method.

18. The method of claim 1, wherein the produced waste water is produced from a hydrocarbon extraction and recovery process.

19. A method for dispersing a polymeric low dose hydrate inhibitor in produced waste water containing the polymeric low dose hydrate inhibitor, the method comprising injecting a dispersing agent into the produced waste water containing the polymeric low dose hydrate inhibitor, and injecting the produced waste water containing the dispersing agent and the polymeric low dose hydrate inhibitor into a water disposal well.

20. The method of claim 19, wherein the dispersing agent is selected from the group consisting of a $C_1$-$C_{20}$ alkyl sulfate, a $C_{10}$-$C_{20}$ alkyl ether sulfate, a $C_{10}$-$C_{20}$ carbonyl sarcosinate, a $C_{10}$-$C_{20}$ alkylbenezene sulfonate, a quaternary-ammonium based corrosion inhibitor, a glycol ether, and a combination thereof.

* * * * *